J. A. CALDWELL & A. F. PLEITZ.
COFFEE-ROASTER.

No. 190,193. Patented May 1, 1877.

UNITED STATES PATENT OFFICE.

JOHN A. CALDWELL AND ADOLPH F. PLEITZ, OF BROWNSVILLE, TENN.

IMPROVEMENT IN COFFEE-ROASTERS.

Specification forming part of Letters Patent No. 190,193, dated May 1, 1877; application filed March 24, 1877.

*To all whom it may concern:*

Figure 1:
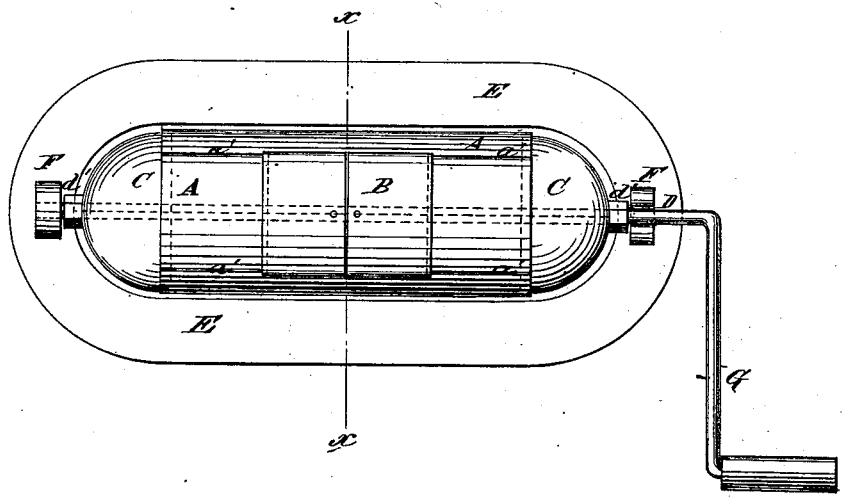
Figure 2:
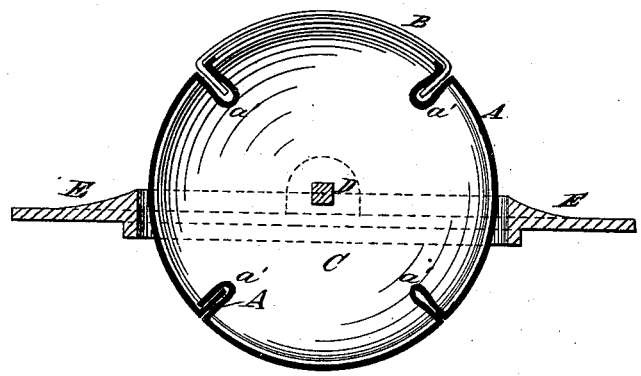

Be it known that we, JOHN ALEXANDER CALDWELL and ADOLPH FERDINAND PLEITZ, of Brownsville, in the county of Haywood and State of Tennessee, have invented a new and useful Improvement in Coffee-Roasters, of which the following is a specification:

Figure 1 is a top view of our improved coffee-roaster. Fig. 2 is a vertical cross-section of the same, taken through the line $x\,x$, Fig. 1.

Similar letters of reference indicate corresponding parts.

The object of this invention is to furnish an improved coffee-roaster which shall be so constructed as to keep the coffee constantly turning over, so that it cannot slide upon the vessel and burn, and which shall be simple in construction, convenient in use, and effective in operation, roasting the coffee very quickly and evenly.

The invention consists in an improved coffee-roaster, formed of the rim or ring provided with the bearings, the shaft, the body, having long inwardly-projecting loops or flanges formed upon it, the sliding doors, the convex ends, and the locking-nuts, constructed and combined with each other, as hereinafter fully described.

E is a rim or ring, so formed as to fit into the top opening of a stove or range, and upon the upper side of the ends of which are cast bearings F, to receive the shaft D. One of the bearings F is made close and the other open, to enable the said shaft D and its attachments to be readily detached from the rim E when desired.

To one end of the shaft E is attached, or upon it is formed, the crank G, by which the device is operated.

A is the body of the cylinder, which is made of sheet metal bent into cylindrical form, and having longitudinal loops $a'$ formed in it, which are closed together, forming inwardly-projecting flanges, the effect of which is to keep the coffee turning over, so that it cannot slide upon the inner surface of the cylinder and get burned.

The edges of the sheet metal forming the cylinder A are seamed together by inserting the one edge in the loop of the other edge, as shown in Fig. 2.

The middle part of one side, between the adjacent loops or flanges $a'$, is cut away, to form an opening for the insertion and removal of the coffee, which opening is closed by two sliding doors, B, the side edges of which are bent inward to enter and slide in the cavities of the loops or flanges $a'$.

C are the ends of the cylinder, which are convexed, or made in the shape of half-spheres, and the edges of which are slipped into the ends of the body A of the cylinder, and are notched to receive the flanges or loops $a'$.

The parts C A C of the cylinder are locked together by nuts $d'$, screwed upon the shaft D, to rest against the ends C C, and which serve, also, as washers to keep the ends C from coming in contact with the bearing F.

Having thus described our invention, we claim as new and desire to secure by Letters Patent—

An improved coffee-roaster, formed of the rim or ring E, provided with the bearings F, the shaft D, the body A, having long inwardly-projecting loops or flanges $a'$ formed upon it, the sliding doors B, the convex ends C, and the locking-nuts $d'$, constructed and combined with each other substantially as herein shown and described.

JOHN ALEXANDER CALDWELL.
ADOLPH FERDINAND PLEITZ.

Witnesses:
W. B. MALONE,
P. B. WINSTON.